(12) United States Patent
Myers et al.

(10) Patent No.: US 8,647,454 B2
(45) Date of Patent: Feb. 11, 2014

(54) METHOD FOR MANUFACTURING PHYSICAL BARRIERS

(75) Inventors: Robert D. Myers, Commerce Township, MI (US); Gerald E. Fitzgerald, Clinton Township, MI (US); Cheong Kow, Troy, MI (US); Randy Stratman, Rochester Hills, MI (US)

(73) Assignee: Sika Technology AG, Baar (CH)

( * ) Notice: Subject to any disclaimer, the term of this patent is extended or adjusted under 35 U.S.C. 154(b) by 1509 days.

(21) Appl. No.: 11/285,458

(22) Filed: Nov. 21, 2005

(65) Prior Publication Data

US 2006/0073266 A1 Apr. 6, 2006

Related U.S. Application Data

(62) Division of application No. 10/198,319, filed on Jul. 18, 2002, now abandoned.

(51) Int. Cl.
*B32B 5/18* (2006.01)

(52) U.S. Cl.
USPC ............................. 156/79; 156/292; 156/293

(58) Field of Classification Search
None
See application file for complete search history.

(56) References Cited

U.S. PATENT DOCUMENTS

| | | | |
|---|---|---|---|
| 2,326,763 A | 8/1943 | Crandell | |
| 3,669,501 A * | 6/1972 | Derleth | 301/37.42 |
| 3,787,986 A * | 1/1974 | Burger | 34/229 |
| 3,788,561 A | 1/1974 | Vilagi et al. | |
| 4,056,161 A * | 11/1977 | Allen, Jr. | 181/290 |
| 4,290,536 A | 9/1981 | Morell | |
| 4,295,573 A | 10/1981 | Terry et al. | |
| 4,588,105 A | 5/1986 | Schmitz et al. | |
| 4,643,863 A * | 2/1987 | Martini | 264/219 |
| 4,932,496 A | 6/1990 | Lammers | |
| 5,266,133 A | 11/1993 | Hanley et al. | |
| 5,267,667 A | 12/1993 | Cozzani | |
| 5,358,397 A | 10/1994 | Ligon et al. | |
| 5,362,428 A * | 11/1994 | Tsujino et al. | 264/40.5 |
| 5,513,769 A | 5/1996 | de Baets | |
| 5,554,325 A | 9/1996 | Kotte et al. | |
| 5,574,108 A | 11/1996 | Antonov et al. | |
| 5,578,128 A | 11/1996 | Schneider | |
| 5,687,092 A | 11/1997 | Bretmersky et al. | |
| 5,690,035 A | 11/1997 | Hatayama et al. | |
| 5,776,579 A | 7/1998 | Jessup et al. | |
| 5,858,287 A | 1/1999 | Scott | |

(Continued)

FOREIGN PATENT DOCUMENTS

DE 19850372 A1 * 5/2000
EP 0 515 287 A1 11/1992

(Continued)

OTHER PUBLICATIONS

International Search Report for PCT/US 03/21474, International Filing Date Jul. 10, 2003 dated Nov. 26, 2003 (5 pages).

*Primary Examiner* — Barbara J Musser
(74) *Attorney, Agent, or Firm* — Harness, Dickey & Pierce, PLC

(57) ABSTRACT

A physical barrier having a carrier device and a sealer material applied to the carrier device. The sealer material is configured to expand when it is activated. In its pre-activation state, the sealer material is flowable. The sealer material is applied directly to the carrier in its pre-activation state through a dispensing orifice without being previously molded.

13 Claims, 4 Drawing Sheets

(56) References Cited

U.S. PATENT DOCUMENTS

| | | |
|---|---|---|
| 6,062,624 A | 5/2000 | Crabtree et al. |
| 6,150,428 A | 11/2000 | Hanley, IV et al. |
| 6,368,438 B1 | 4/2002 | Chang et al. |
| 6,387,470 B1 | 5/2002 | Chang et al. |
| 6,540,104 B1 | 4/2003 | Yanagita et al. |
| 6,820,923 B1 * | 11/2004 | Bock ................. 296/187.02 |
| 2003/0044553 A1 * | 3/2003 | Ramanathan et al. ....... 428/35.8 |
| 2003/0140671 A1 * | 7/2003 | Lande et al. .................. 72/46 |

FOREIGN PATENT DOCUMENTS

| | | |
|---|---|---|
| EP | 0524 092 A1 | 1/1993 |
| EP | 0 755 768 A1 | 1/1997 |
| JP | 62-238111 A * | 10/1987 |
| WO | WO01/85352 A1 | 11/2001 |
| WO | WO01/85352 A2 | 11/2001 |
| WO | WO-02/26550 A1 | 4/2002 |

* cited by examiner

METHOD FOR MANUFACTURING PHYSICAL BARRIERS

CROSS-REFERENCE TO RELATED APPLICATIONS

This application is a Divisional of application Ser. No. 10/198,319 filed Jul. 18, 2002 now abandoned.

FIELD OF THE INVENTION

This invention relates to the field of physical barriers used to seal openings in panel members or other objects.

BACKGROUND OF THE INVENTION

Physical barriers are commonly used to seal openings in certain objects, such as panel members in motor vehicles, buildings, household appliances, etc. These barriers normally are used to prevent physical materials, fluids, and gases such as environmental contaminants, fumes, dirt, dust moisture, water, etc., from passing through the opening in the object. For example, an automotive panel member, such as a door panel, typically has several openings in the sheet metal, which are created for various reasons during manufacturing. Further, various structural components of automobile bodies have a variety of orifices, hollow posts, cavities, passages and openings (collectively, "openings") that can allow contaminants into the passenger compartment. These openings are preferably sealed before the vehicle is delivered to the end customer.

Known physical barriers usually include a sealer material applied to a carrier device, which typically comprises a molded-plastic component. Heretofore, the sealer has been molded into a relatively rigid component, the shape of which being adapted to fit on or within predetermined areas, i.e., "placement areas", on the carrier. Each sealer/carrier combination has been designed (in shape and size) to match a particular opening (having a similar shape and size) in a given panel member. The carrier is generally adapted to fill the majority of the opening, while the sealer is adapted to seal around the interface between the carrier and the perimeter of the opening. Many times, the sealer comprises a material that can be activated to expand and seal the interface between the carrier and the edges of the panel member that define the opening. Such sealers can be activated in a variety of ways, including by a temperature change (usually the application of heat) or by the introduction of a chemical agent. For example, one common method of activating heat-activated sealers used on automobiles is to allow the elevated temperatures applied to the vehicle during the coating and/or painting processes to activate the sealers and cause them to expand, thereby creating a complete seal around the openings.

A significant drawback to known barriers is that they are labor-intensive to manufacture. Known methods of manufacture involve specifically molding the sealer material into a rigid component whose shape matches that of its corresponding position on or within the carrier. Then, the molded sealer component has been manually installed onto or into the carrier. The manual installation of the molded sealer component is particularly difficult because the allowed workspace for workers to perform this function is typically very limited, and the task requires good fine motor control. In effect, the steps of molding the sealer material into a rigid shape and manually placing the molded sealer material into or onto a carrier are significant components in the overall cost and time required to manufacture physical barriers of this type.

Consequently, the inventors hereof have recognized a need for an improved system and method of manufacturing physical barriers.

SUMMARY OF THE INVENTION

The present invention relates to an improved physical barrier and a system and method for manufacturing the improved barrier. The inventive system includes a flowable, pre-activation, expandable sealer material and a dispensing orifice configured to dispense the sealer material directly onto a carrier.

DETAILED DESCRIPTION OF A PREFERRED EMBODIMENT

Figure 1:
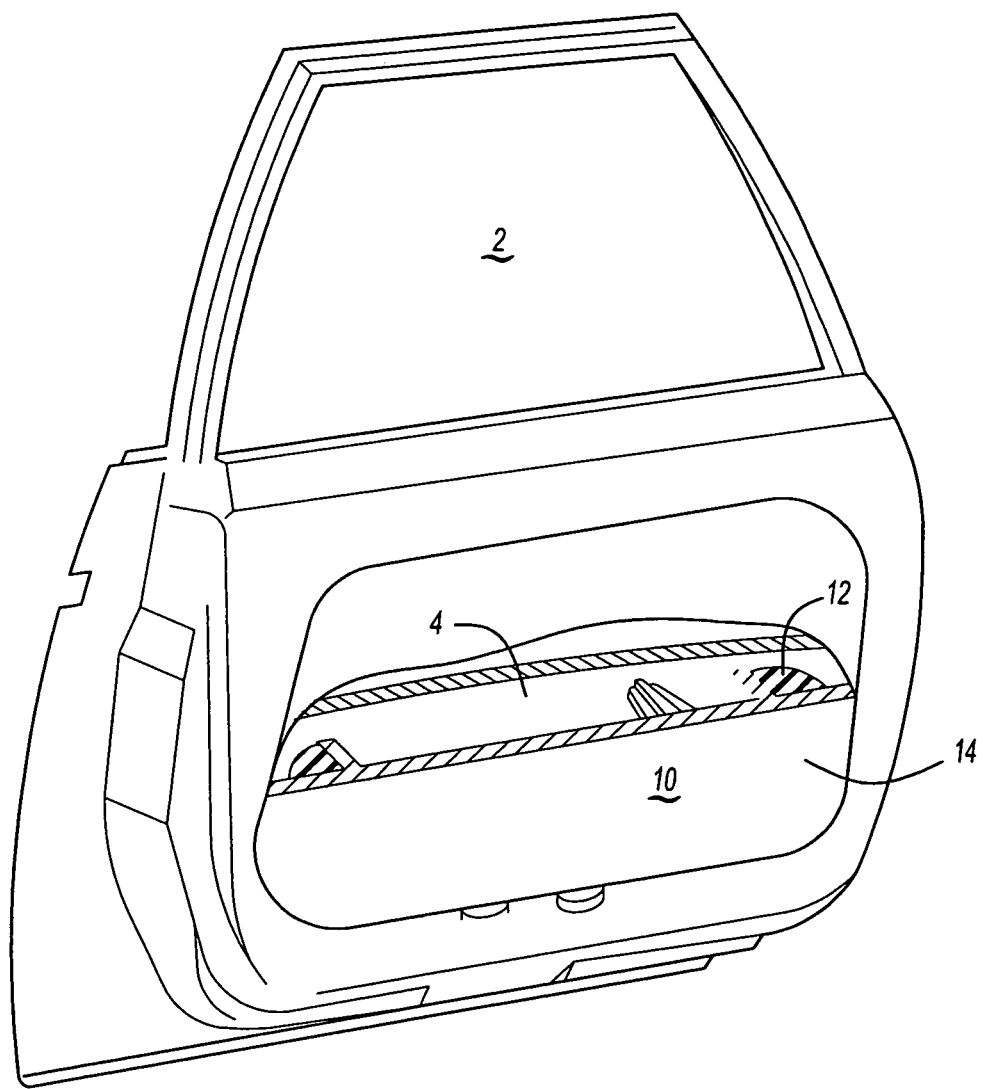
FIG. 1 shows a cut away view of an illustrative physical barrier installed on a panel member with a sealer material in a pre-activation state.

To illustrate a sample environment in which physical barriers are used to seal openings, cavities and other openings, FIG. 1 shows a panel member 2, such as an automobile door panel, in which a barrier 10 has been inserted into an opening 4. As seen in the cut away, barrier 10 includes a pre-activation sealer material 12 and a carrier 14. After activation of the sealer material, the barrier 10 acts to seal the opening and to prevent air, water, sound, dirt, and other particles from passing through the opening.

Figure 2:
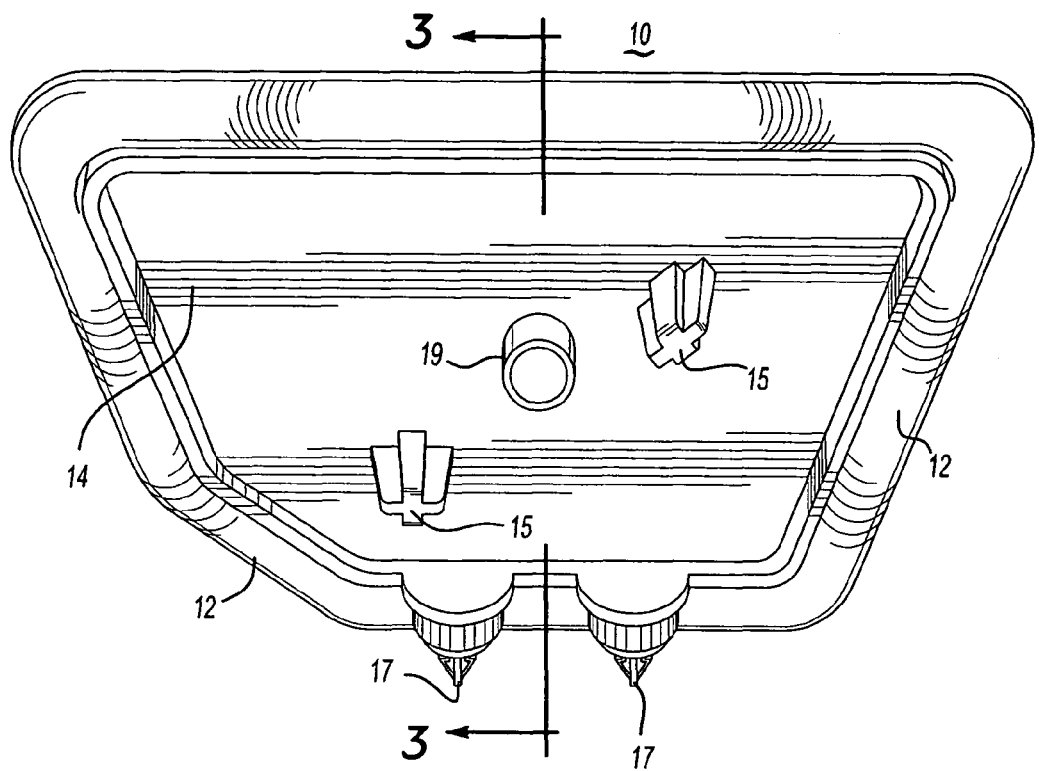
FIG. 2 shows a perspective view of a physical barrier according to an embodiment of the present invention.
Figure 3:
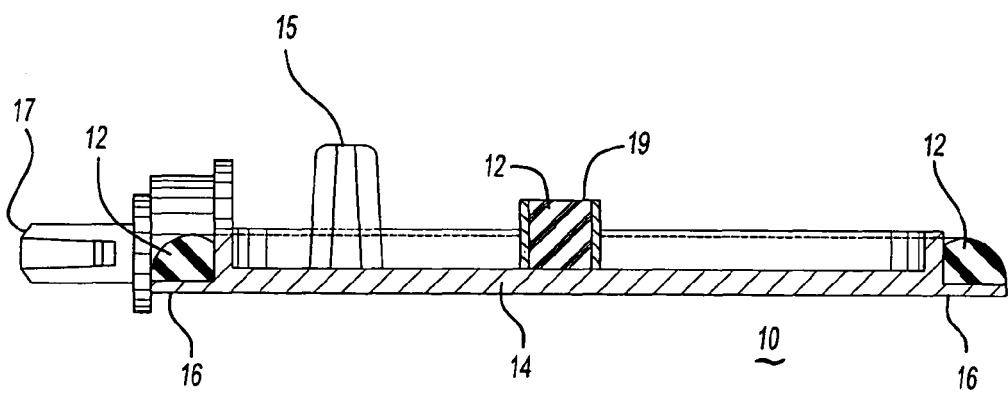
FIG. 3 shows a cross-sectional view of a physical barrier according to an embodiment of the present invention.

FIGS. 2 and 3 show different magnified views of a physical barrier 10 for sealing an opening according to an embodiment of the present invention, wherein like elements are identified by like numerals. Barrier 10 comprises a carrier device 14 and a sealer material 12 applied thereto. The carrier 14 can be designed to be of any shape that is appropriate to fill an opening or a cavity. The sealer material 12 is an expandable sealer that expands upon being activated. Further, the sealer material 12 is flowable (liquid) in its pre-activation state. The sealer material 12 is applied to the carrier 14 from a dispenser device (not shown in FIGS. 2 and 3) during manufacture of the barrier 10. The sealer material 12 is applied during manufacture of the barrier 10 in its pre-activation, liquid state. As shown in FIG. 3, the carrier 14 preferably includes a sealer placement area 16, such as a ledge, where the flowable sealer material 12 is applied and supported by the carrier 14. The placement area 16 can also be in the form of troughs or wells 19 on a surface of carrier 14, as shown in FIG. 2. Further, the carrier 14 preferably includes handling structures 15 that facilitate engagement with a movement device that can be used to position the carrier 14 relative to a dispensing device (not shown) to receive the sealer material 12. For example, the movement device could be a robot arm that engages the handling structure 15 to move the carrier 14 from one location to another. The handling structures 15 can be of virtually any shape or construction, provided that they are engagable with a movement device to position and manipulate the carrier during the manufacture process. Finally, the carrier 14 also preferably includes installation structures 17, which facilitate the final installation of the carrier 14 into an opening or cavity.

Sealer material 12 can comprise a variety of sealers, but it is preferably one that expands upon activation, such as in response to a change in temperature or an introduction of a chemical compound. Preferably, the sealer has an expansion ratio of between about 100% to 1500%. In one embodiment of the invention, the sealer material 12 is a heat-activated expanding foam sealer. The sealer material 12 should be flowable prior to being activated. That is, prior to being expanded, the sealer material 12 should have a viscosity that is sufficiently low to allow the material to flow through a dispensing device and allow the sealer material 12 to take on various shapes defined by the carrier 14. On the other hand, the viscosity of the pre-activation sealer material 12 should be sufficiently high such that the sealer material remains essentially stationary once it is applied to the carrier 14. Preferred sealer materials include those described in U.S. Pat. Nos. 5,266,133; 6,150,428; 6,368,438; and 6,387,470, the disclosures of which being incorporated herein by reference. More preferred sealer materials include those that are commercially-available from Sika Corporation under the marks, SikaBaffle® and SikaReinforcer®. The most preferred sealer material is commercially-available SikaBaffle® 240.

The carrier 14 may be manufactured from a variety of conventional materials, provided that the shape of the carrier 14 remains substantially unchanged in response to the stimulus used to activate the sealer materials 12. For example, when physical barriers manufactured according to the present invention are used to seal openings in automotive door panels, the carrier 14 should be made of a material capable of withstanding the elevated temperatures associated with the coating and painting steps of the automobile manufacturing process, which is typically used to activate the sealer material. While the carrier 14 can be made from a variety of materials (including several metals), it is preferred that the carrier 14 is manufactured from plastic due to the reduced weight and lower force required to install the carrier into an opening. Nylon is the preferred plastic material for manufacturing carriers 14.

A physical barrier 10 of the present invention is preferably manufactured according to the following procedure and system. The physical barrier 10 is preferably manufactured using an automated assembly line or station of a type known in the art. Generally, a collection of blank carrier devices 14 (without sealer material) are stored or stacked at the beginning of the assembly line or station. In succession, the blank carrier devices are automatically positioned relative to a dispensing device such that the dispensing device can apply the flowable, expandable, pre-activation sealer material 12 to the carrier device 14. The pre-activation sealer material is applied to the placement area(s) on the carrier 14. As described above, the placement area(s) may comprise a variety of areas, such as a ledge 16, a trough or a well 19. The amount of sealer applied to the placement area can be varied to customize the sound characteristics of the panel device. For example, additional sealer material can be applied to decrease the sound transmission through the panel device, and less sealer can be applied to increase the sound transmission through the panel device. Typically, after being manufactured, the barrier (with the pre-activation sealer) is provided to a third party, who installs the barrier into the panel member requiring sealing and later causes the sealer to be activated.

Since the sealer material 12 is applied to the carrier 14 in its flowable state, no separate molding step is required to form rigid sealer components whose shapes match those of corresponding placement areas on the carriers 14. Further, this method of applying the flowable sealer material eliminates the prior art step of manually inserting the rigid sealer elements into the carrier. Additionally, this method makes it easy to change the amount of pre-activation material applied to the carrier 14—thereby customizing the sound characteristics of the panel member—without creating new molds and otherwise creating new preformed rigid sealer components.

The dispensing device may comprise a variety of known nozzles capable of dispensing a flowable, expandable sealer material. The dispensing device may be moveable or stationary. Typically, if the dispensing device is stationary, the manufacturing process includes moving the barrier 10 relative to the dispensing device so that the dispensing device can apply the flowable sealer material 12. If, on the other hand, the dispensing device is moveable, the process normally includes maintaining the barrier 10 stationary while the sealer material 12 is applied. While many embodiments of the dispensing device may be employed, it is preferred that the dispensing device include a movable robot arm with a dispensing orifice (nozzle) mounted thereon. The dispensing device may also include pumps, motors, metering devices, and holding tanks, as are known in the art, to facilitate the dispensing of sealer material 12 onto the carrier 14.

Figure 4:
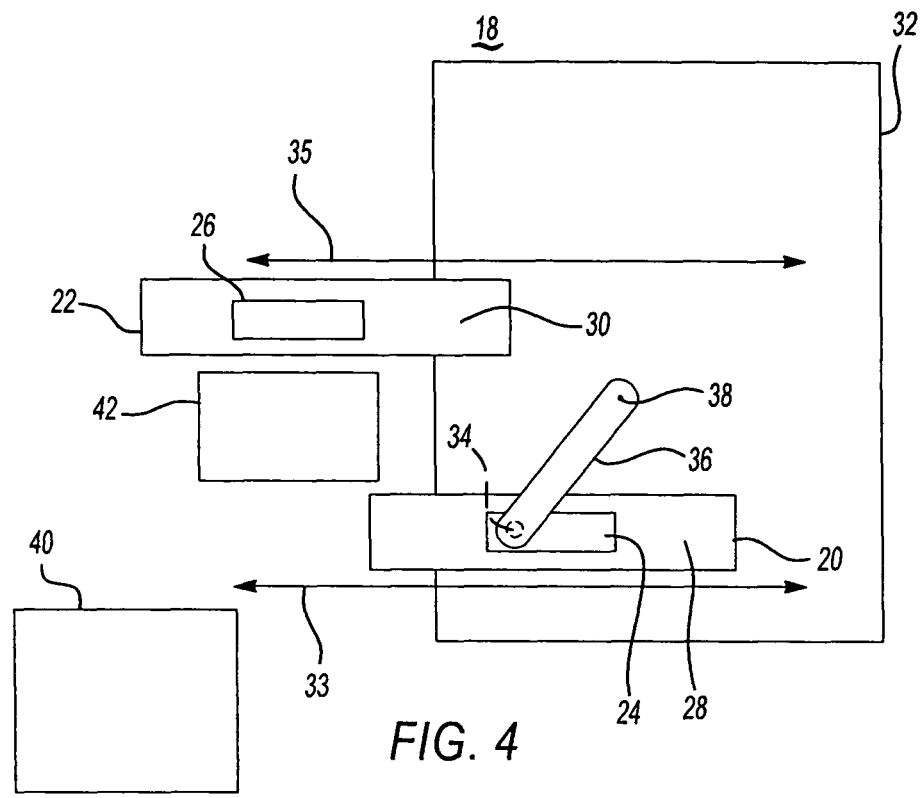
FIG. 4 shows a top view of an embodiment of a system used to implement the present invention.
Figure 5:
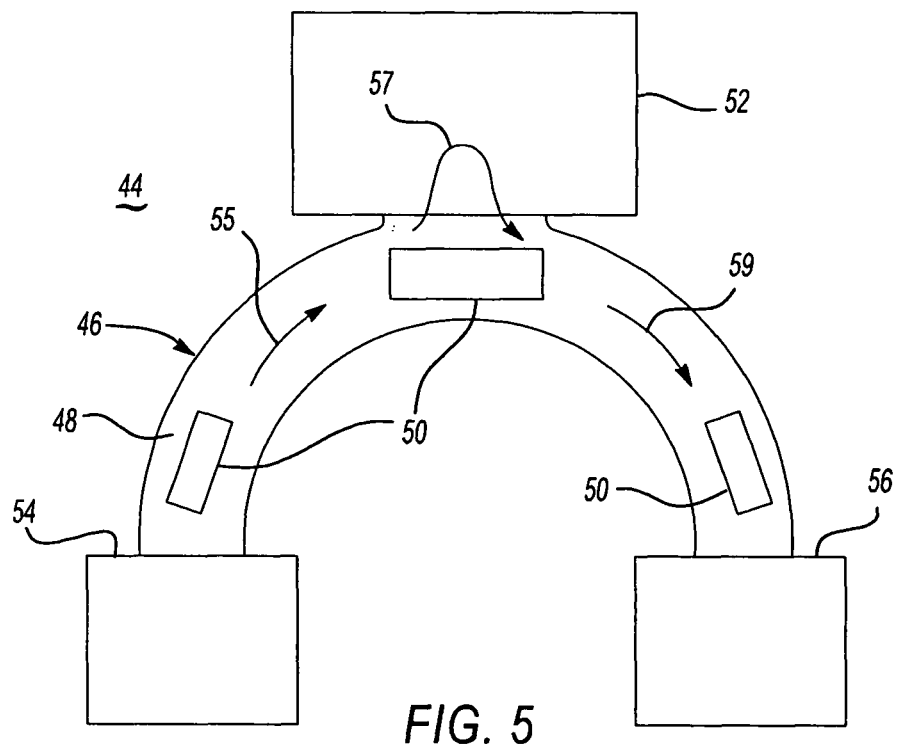
FIG. 5 shows a top view of an embodiment of a system used to implement the present invention.
Figure 6:
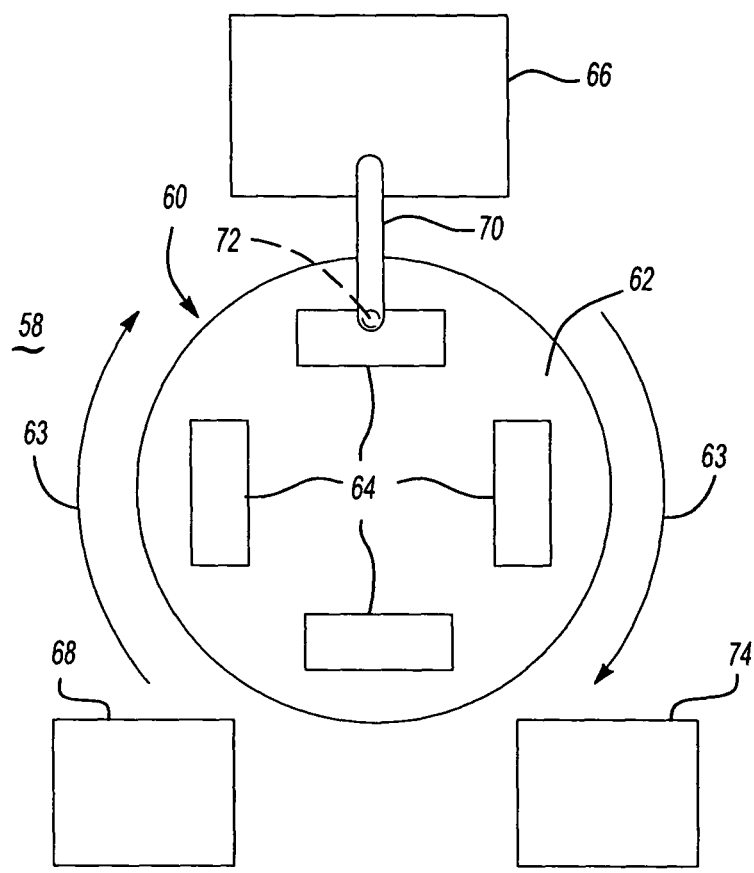
FIG. 6 shows a top view of an embodiment of a system used to implement the present invention.

While the automated assembly line or station used to manufacture physical barriers according to the present invention can comprise a variety of known systems, FIGS. 4, 5, and 6 illustrate three exemplary systems that can be used. Referring first to FIG. 4, an automated system 18 includes trays 24 and 26 and reciprocating tables 28 and 30. Trays 24 and 26 are each adapted to hold a single carrier 14. The trays 24 and 26 rest on respective tables 28 and 30. Tables 28 and 30 are configured to be automatically moved in a reciprocal fashion back and forth from a dispensing device 32 (as shown by arrows 33 and 35). Dispensing device 32 includes movable robotic dispensing arm 36, which is mounted to dispensing device 32 at an elevated position (relative to the dispensing device 32) at axis point 38. The dispensing arm 36 is mounted sufficiently high so as to allow the reciprocating tables 28, 30 to pass below the dispensing arm 36. The dispensing arm 36 includes a dispensing outlet 34, which is configured to dispense the flowable sealer material 12 onto a carrier device 14. An electronic controller (not shown) is generally used to control the movement of the various components of the system, as well as the application of sealer material 12 through the dispensing orifice 34.

The system shown in FIG. 4 operates as follows. A blank carrier device 14 is taken from a blank parts storage area 42 and placed on tray 24. The reciprocating table 20 moves so as to position the tray 24 within range of the movable arm 36. The arm 36 rotates about the pivot axis 38 so that the dispensing orifice 34 passes over the carrier 14. The dispensing orifice 34 dispenses the pre-activation flowable sealer material 12 onto the carrier 14. The combination of the arc path traveled by the arm 36 and the linear motion of the table 20 allows the dispensing device 32 to control the application of the sealer material so as to cover any portion of the carrier 14. When the sealer material 12 has been fully applied to the carrier 14, the table 20 is retrieved from the dispensing device 32 and the carrier 14 (now having sealer 12 applied to it) is taken from tray 24 and stored in finished parts storage area 40.

While the blank carrier 14 on tray 24 is being moved to within range of the arm 36, the table 30 is moved away from the dispensing device 32, where it is prepared to receive its own blank carrier device 14 from the parts storage area 42. When table 20 is retrieved from the dispensing device 32, table 30 is moved into range of the arm 36, which is rotated about its connection axis 38 so as to be positioned over the table 20. Then, sealer material is applied to the carrier positioned on table 30, as described above.

FIG. 5 illustrates another embodiment of a system that could be employed to perform the present invention. The system shown in FIG. 5 includes a conveyor belt 48 and multiple trays 50. Each tray 50 is configured to hold a blank carrier device 14. The conveyor belt 48 is generally arc-shaped and carries multiple trays 50 from a blank parts area 54, toward a dispensing device 52, as shown by arrow 55. The dispensing device 52 is configured to apply sealer material 12 onto the carriers 14 passing by it. The dispensing device 52 may accomplish this function in a variety of ways. For example, the dispensing device 52 may have a moveable arm (not shown) as described above that is configured to pass over the trays 55 as they pass by and dispense the sealer material 12. Alternatively, the conveyor belt 48 may be configured to pass the trays 55 into the dispensing device, where the carriers 14 are passed under a stationary dispensing orifice that applies the sealer material 12. Regardless of the method employed by dispensing device 52, after the sealer material 12 is applied to the carriers 14, they are transported to the finished parts area 56 by conveyor belt 48, as shown by arrow 59.

FIG. 6 illustrates yet another embodiment of a system that could be employed to implement the present invention. The system shown in FIG. 6 includes a turntable 62, upon which multiple trays 64 are positioned. Each of the trays is configured to hold a carrier device 14. The turntable 62 is configured to rotate about its center in the direction, for example, shown by arrows 63. As each tray 64 passes by blank parts storage area 68, a blank carrier 14 is placed in the tray 64. The turntable 62 causes the tray (now holding a blank carrier 14) to be passed by or through a dispensing device 66. The dispensing device 66 includes a dispensing orifice 72, which is configured to dispense sealer material 12 and apply the sealer material to a blank carrier 14. As in previously-described embodiments, the dispensing orifice 72 may be positioned at the end of a moveable or stationary arm mounted such that blank carriers can be moved beneath the dispensing orifice 72. When a blank carrier 14 is passed under the dispensing orifice 72, the sealer material 12 is applied to the blank carrier 14. Then, the carrier 14 is moved to a finished parts area 74 by the turntable 62.

While the invention hereof has been specifically described in connection with certain specific embodiments thereof, one skilled in the art will recognize that various modifications could be made to those embodiments and still be within the scope of the invention. For example, while it is preferable to apply the flowable sealer material to a "placement area", such as a trough, well or ledge, the flowable sealer material can actually be applied to virtually any surface of the carrier and still function appropriately. Further, while the present invention has been described in connection with different embodiments of automated systems that could be used to implement the present invention, one skilled in the art will recognize other systems that could be used equally advantageously. For example, the dispensing orifice may be embodied in a robot arm that can be moved in one, two, or three dimensions. Alternatively, the dispensing orifice can be held stationary, while the carrier devices are moved relative to the dispensing orifice. Accordingly, the specific embodiments described herein are for purposes of illustration only and not of limitation, and the scope of the appended claims should be construed as broadly as the prior art will permit.

What is claimed is:

1. A method of manufacturing a physical barrier configured to be installed on an object having an opening, comprising the steps:
   providing a carrier;
   determining a desired sound transmission characteristic of the physical barrier;
   determining an amount of a flowable sealer material necessary to achieve said desired sound transmission characteristic;
   applying said amount of said flowable sealer material to said carrier, including at least a perimeter of said carrier, said flowable expandable sealer material being configured to expand upon activation, wherein said flowable material has an expansion ratio greater than 100% and a viscosity that is sufficiently low to allow the flowable material to take on a shape defined by said carrier when the flowable material is installed to said carrier; and
   providing a handling structure on said carrier, said handling structure disposed within said perimeter of said carrier and configured to allow positioning of the carrier after the flowable sealer material is applied, said handling structure configured to be installed to the object with said carrier, said handling structure thereby remaining permanently installed with said carrier to the object after said carrier is installed to the object.

2. The method of claim 1, wherein said applying step comprises:
   adjusting a physical position of said carrier and a dispensing nozzle relative to each other; and
   dispensing said expandable sealer material from said dispensing nozzle onto said carrier.

3. The method of claim 1, wherein said applying step comprises applying said flowable sealer to a trough on said carrier, said trough being configured to confine said flowable expandable sealer material.

4. The method of claim 1, further comprising applying an additional amount of said expandable sealer material to an area within said perimeter of said carrier, such that said expandable sealer material applied to said perimeter of said carrier generally bounds said additional amount of said expandable sealer material.

5. The method of claim 1, further comprising providing at least one installation structure on said carrier, said installation structure configured to secure said carrier to the object prior to activation of said expandable material.

6. The method of claim 5, further comprising inserting said installation structure into an opening defined by the object, thereby securing said carrier to the object before activating said expandable sealer.

7. A method of sealing an orifice in an object, comprising:
   providing a physical barrier including a carrier, the carrier having a perimeter;
   providing a handling structure on said carrier, said handling structure disposed within said perimeter of said carrier;
   determining a desired sound transmission characteristic of the physical barrier;
   determining an amount of a flowable sealer material necessary to achieve said desired sound transmission characteristic;
   applying said amount of said flowable sealer material to said carrier from a dispensing orifice, said flowable expandable sealer material being configured to expand upon activation, wherein said flowable material has an expansion ratio greater than 100% and a viscosity that is sufficiently low to allow the flowable material to take on a shape defined by said carrier when the flowable material is installed to said carrier;

securing said carrier to the object, thereby also securing said handling structure to the object; and activating said flowable sealer material so as to cause said flowable sealer material to expand and cooperate with said carrier to seal the orifice of the object, such that said handling structure is permanently installed with said carrier to the object.

8. The method of claim 7, wherein said step of activating comprises subjecting said flowable sealer material to a stimuli chosen from the following group: (i) application of heat above ambient and (ii) introduction of a chemical compound.

9. The method of claim 7, further comprising positioning said carrier relative to the object with said handling structure.

10. The method of claim 7, further comprising providing a trough extending about a perimeter of said carrier, wherein said applying step comprises applying said expandable sealer material to said trough on said carrier, said trough being configured to confine said flowable expandable sealer material.

11. The method of claim 7, further comprising:
adjusting a physical position of said carrier and said dispensing nozzle relative to each other; and
dispensing said expandable sealer material from said dispensing nozzle onto said carrier.

12. The method of claim 4, establishing applying said additional amount of said expandable sealer material as applying said expandable sealer material in a well defined by said carrier.

13. The method of claim 7, wherein said carrier is secured to the object prior to a painting operation associated with the object.

* * * * *